United States Patent
Morita et al.

(10) Patent No.: US 11,322,757 B2
(45) Date of Patent: May 3, 2022

(54) FUEL CELL SYSTEM

(71) Applicant: Panasonic Intellectual Property Management Co., Ltd., Osaka (JP)

(72) Inventors: Junji Morita, Kyoto (JP); Takehiko Ise, Osaka (JP); Yoshito Usuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/208,641

(22) Filed: Dec. 4, 2018

(65) Prior Publication Data

US 2019/0198895 A1   Jun. 27, 2019

(30) Foreign Application Priority Data

Dec. 21, 2017   (JP) .............................. JP2017-244996

(51) Int. Cl.
*H01M 8/04089*   (2016.01)
*H01M 8/04746*   (2016.01)
(Continued)

(52) U.S. Cl.
CPC ... *H01M 8/04097* (2013.01); *H01M 8/04014* (2013.01); *H01M 8/04231* (2013.01);
(Continued)

(58) Field of Classification Search
CPC ......... H01M 8/04097; H01M 8/04014; H01M 8/04231; H01M 8/04462; H01M 8/04731;
(Continued)

(56) References Cited

U.S. PATENT DOCUMENTS

2012/0295173 A1* 11/2012 Yamamoto .......... H01M 8/0612
                                                                429/423
2015/0303496 A1* 10/2015 Nakamoto .......... H01M 8/0435
                                                                429/414
(Continued)

FOREIGN PATENT DOCUMENTS

JP   2008-235205         10/2008
JP   2008243633 A  *     10/2008
(Continued)

OTHER PUBLICATIONS

JP-6229145-B2—Machine Translation.*

*Primary Examiner* — Brian R Ohara
*Assistant Examiner* — Patrick Marshall Greene
(74) *Attorney, Agent, or Firm* — McDermott Will & Emery LLP (57) ABSTRACT

A fuel cell system includes: a fuel cell; an anode off-gas discharge path through which an anode off-gas exhausted from an anode of the fuel cell is discharged; a heating medium circulation path through which a heating medium that recovers heat generated in the fuel cell is circulated; a heat exchanger disposed in the heating medium circulation path; an electric power converter that converts the electric power output from the fuel cell; a case that houses the electric power converter; a first air feeder that supplies air to the case; a housing that houses the fuel cell, the case, and the first air feeder; and an air discharge path through which the air having passed through the case is discharged to outside of the housing. A downstream end of the anode off-gas discharge path is connected to the air discharge path.

9 Claims, 5 Drawing Sheets

(51) Int. Cl.
*H01M 8/2475* (2016.01)
*H01M 8/04701* (2016.01)
*H01M 8/04014* (2016.01)
*H01M 8/04223* (2016.01)
*H01M 8/0444* (2016.01)
*H01M 8/1018* (2016.01)

(52) U.S. Cl.
CPC ... *H01M 8/04462* (2013.01); *H01M 8/04731* (2013.01); *H01M 8/04761* (2013.01); *H01M 8/04768* (2013.01); *H01M 8/2475* (2013.01); *H01M 8/1018* (2013.01)

(58) Field of Classification Search
CPC ......... H01M 8/04761; H01M 8/04768; H01M 8/2475; H01M 8/1018
See application file for complete search history.

(56) References Cited

U.S. PATENT DOCUMENTS

| | | | |
|---|---|---|---|
| 2016/0268612 A1* | 9/2016 | Ushiyama | H01M 8/04701 |
| 2018/0175409 A1* | 6/2018 | Yukimasa | G05D 7/0682 |
| 2019/0165393 A1* | 5/2019 | Kaneko | H01M 8/0432 |

FOREIGN PATENT DOCUMENTS

| | | | |
|---|---|---|---|
| JP | 2009043526 A | * | 2/2009 |
| JP | 6229145 B2 | * | 11/2017 |

\* cited by examiner

FUEL CELL SYSTEM

BACKGROUND

1. Technical Field

The present disclosure relates to a fuel cell system.

2. Description of the Related Art

In one previously proposed fuel cell system that uses pure hydrogen as a fuel gas, the fuel gas (anode off-gas) not used for electric power generation is returned back to the anode of the fuel cell and reused. However, in this fuel cell, for example, a phenomenon occurs in which part of nitrogen in air supplied to the cathode migrates to the anode side through an electrolyte. In this case, when the electric power generation of the fuel cell is continued, the concentration of nitrogen in the fuel gas increases gradually, so that the electric power generation efficiency of the fuel cell decreases.

For example, one method proposed to prevent the reduction in the electric power generation efficiency of the fuel cell as described above includes a purge operation in which impurities such as nitrogen in the anode off-gas are discharged to the outside. In this purge operation, since flammable hydrogen gas, as well as nitrogen, is present in the anode off-gas, it is necessary that the anode off-gas be diluted to a desired hydrogen gas concentration and then discharged to the atmosphere.

Japanese Unexamined Patent Application Publication No. 2008-235205 discloses a fuel cell system including: a heating medium circulation path through which a heating medium that recovers the heat of the fuel cell passes; a radiator (heat exchanger) in which heat is exchanged between the heating medium and air; and a fan that blows air into the heat exchanger. In this system, air having passed through the heat exchanger is used to dilute purge gas during the purge operation.

SUMMARY

In the conventional example, however, no studies were conducted on an air shortage problem that occurs when the anode off-gas is diluted with air in the purge operation.

One non-limiting and exemplary embodiment provides a fuel cell system in which, in the purge operation for discharging impurities in the anode off-gas to the outside, the amount of air used to dilute the anode off-gas can be maintained more appropriately than in the conventional example.

In one general aspect, the techniques disclosed here feature a fuel cell system including: a fuel cell that generates and outputs electric power using a fuel gas supplied to an anode and an oxidant gas supplied to a cathode; an anode off-gas discharge path through which an anode off-gas exhausted from the anode of the fuel cell is discharged; an electric power converter that converts the electric power output from the fuel cell; a case that houses the electric power converter; a first air feeder that supplies air to the case; a housing that houses the fuel cell, the case, and the first air feeder; and an air discharge path through which the air having passed through the case is discharged to outside of the housing, wherein a downstream end of the anode off-gas discharge path is connected to the air discharge path.

The fuel cell system in the above aspect of the present disclosure has the effect that the amount of air used to dilute the anode off-gas during the purge operation for discharging impurities in the anode off-gas to the outside can be maintained more appropriately than in the conventional example.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Extensive studies have been conducted on the air shortage problem that occurs when the anode off-gas is diluted with air in the purge operation for discharging impurities in the anode off-gas to the outside, and the following findings have been obtained.

In, for example, the solid polymer fuel cell system described above, the heat exchanger is disposed in the heating medium circulation path through which the heating medium (e.g., water) having passed through the fuel cell is circulated, and the temperature of the fuel cell is controlled by controlling the amount of outside air (air) supplied to the heat exchanger and used to cool the heating medium.

The inventors have focused attention on the difference in fuel cell output power between the vehicle fuel cell system described in Japanese Unexamined Patent Application Publication No. 2008-235205 and a stationary fuel cell system. Specifically, the output power of the stationary fuel cell is several hundreds of W (watts) to several KW (kilowatts). However, the output power of the vehicle fuel cell described in Japanese Unexamined Patent Application Publication No. 2008-235205 is several tens of KW to several hundreds of KW. Therefore, the amount of heat generated in the former is significantly smaller than that in the latter.

When a fuel cell system is used in, for example, a low-outside air temperature environment such as a cold district in winter, there is a necessity to reduce the amount of air supplied to the heat exchanger for the purpose of controlling the temperature of the fuel cell so that the temperature of the fuel cell is prevented from falling below the lower limit of its operating temperature. Because of the reason described above, this necessity is higher in the stationary fuel cell system than in the vehicle fuel cell system.

Specifically, in the stationary fuel cell system configured to dilute the anode off-gas using air supplied to the heat exchanger, it may be difficult to dilute the anode off-gas sufficiently in a low-outside air temperature environment.

The present inventors have conducted extensive studies to address the above problem and found that a fuel cell system may include a fuel cell that operates at a temperature between the upper and lower limits of its operating temperature and an electric power converter that operates at a temperature equal to or lower than the upper limit of its operating temperature. The inventors have thereby arrived at aspects of the present disclosure.

A fuel cell system in a first aspect of the present disclosure has been contrived based on the above findings and includes: a fuel cell that generates and outputs electric power using a fuel gas supplied to an anode and an oxidant gas supplied to a cathode; an anode off-gas discharge path through which an anode off-gas exhausted from the anode of the fuel cell is discharged; an electric power converter that converts the electric power output from the fuel cell; a case that houses the electric power converter; a first air feeder that supplies air to the case; a housing that houses the fuel cell, the case, and the first air feeder; and an air discharge path through which the air having passed through the case is discharged to outside of the housing, wherein a downstream end of the anode off-gas discharge path is connected to the air discharge path.

In this structure, the amount of air used to dilute the anode off-gas during the purge operation for discharging impurities in the anode off-gas to the outside can be maintained more appropriately than in conventional fuel cell systems.

More specifically, in the fuel cell system in this aspect, during the purge operation for discharging impurities in the anode off-gas to the outside, the air used to cool the electric power converter is used to dilute the anode off-gas. Therefore, the anode off-gas can be diluted with air separately from the temperature control of the fuel cell. Unlike the fuel cell, the electric power converter is a device that operates at a temperature equal to or lower than the upper limit of its operating temperature. Specifically, it is only necessary for radiators (the case and the first air feeder) for the electric power converter to have the function of cooling the electric power converter to a temperature equal to or lower than the operating temperature of the components (e.g., semiconductor elements) of the electric power converter. Therefore, since it is unnecessary that the controlled variable (i.e., the amount of air) of the first air feeder for supplying air to the electric power converter be controlled in accordance with a reduction in outside temperature (i.e., controlled using a small amount of air), the necessary amount of air used to dilute the anode off-gas can be easily maintained.

In a second aspect of the present disclosure, the fuel cell system in the second aspect may further include: a heating medium circulation path through which a heating medium that recovers heat generated in the fuel cell is circulated; a heat exchanger disposed in the heating medium circulation path; and a second air feeder that supplies air to the heat exchanger, wherein the housing may house the heat exchanger and the second air feeder.

In a fuel cell system in a third aspect according to the first aspect of the present disclosure, the air discharge path may include: a first discharge path extending from an air outlet provided in the housing to the case; and a second discharge path branched from the first discharge path and extending to the heat exchanger.

With this structure, the number of air outlets in the housing can be reduced.

In a fuel cell system in a fourth aspect according to the third aspect of the present disclosure, the downstream end of the anode off-gas discharge path may be connected to the first discharge path.

With this structure, in the purge operation for discharging impurities in the anode off-gas to the outside, the air used to cool the electric power converter is used to dilute the anode off-gas, and the air used to cool the heat exchanger can be used to further dilute the anode off-gas.

During startup, shutdown, and standby of the fuel cell system, it is unnecessary to control the temperature of the fuel cell. Therefore, during startup, shutdown, and standby of the fuel cell system, since it is unnecessary that the controlled variable (i.e., the amount of air) of the second air feeder for supplying air to the heat exchanger be controlled in accordance with a reduction in outside temperature (i.e., controlled using a small amount of air), the concentration of hydrogen in the anode off-gas can be further reduced.

In a fuel cell system in a fifth aspect according to the third aspect of the present disclosure, the downstream end of the anode off-gas discharge path may be connected to the second discharge path.

With this structure, in the purge operation for discharging impurities in the anode off-gas to the outside, the anode off-gas can be diluted with the air used to cool the heat exchanger and with the air used to cool the electric power converter.

In a fuel cell system in a sixth aspect according to any one of the first to fifth aspects of the present disclosure, the first air feeder may include a fan that blows air and a hood that surrounds the fan. An inside of the housing is ventilated by causing air to pass through a space formed between the hood and the housing by the first air feeder.

In this structure, the electric power converter can be cooled while the inside of the housing is ventilated.

In a fuel cell system in a seventh aspect according to the six aspect of the present disclosure, air flowing into the housing from an air inlet provided therein passes through the space, then flows sequentially through the hood, the case, and the air discharge path, and is discharged to the outside of the housing.

In this structure, the electric power converter can be cooled while the inside of the housing is ventilated.

In the above-configured fuel cell system in this aspect, the first air feeder can serve as a ventilator. In this case, even when the controlled variable (i.e., the amount of air) of the second air feeder for supplying air to the heat exchanger is controlled in accordance with a reduction in outside temperature (i.e., controlled using a small amount of air), the inside of the housing can be appropriately ventilated. When no dedicated ventilator is necessary or when the dedicated ventilator can be reduced in size, the structure of the fuel cell system can be simplified, and a reduction in cost can be achieved.

Embodiments of the present disclosure will be described with reference to the accompanying drawings. In the embodiments described below, examples of the above aspects will be shown.

Numerical values, shapes, materials, components, and their arrangement and connections shown below are merely examples and do not limit the aspects described above, unless these features are stated in the claims. Among the components in the following description, components not stated in the independent claim defining the broadest concept of the aspects are described as optional components. In the drawings, description of components with the same reference symbols may be omitted as appropriate. The drawings illustrate components schematically for the sake of facilitating understanding, and their shapes, dimension ratio, etc. may not be accurately illustrated.

First Embodiment

[System Structure]

Figure 1:
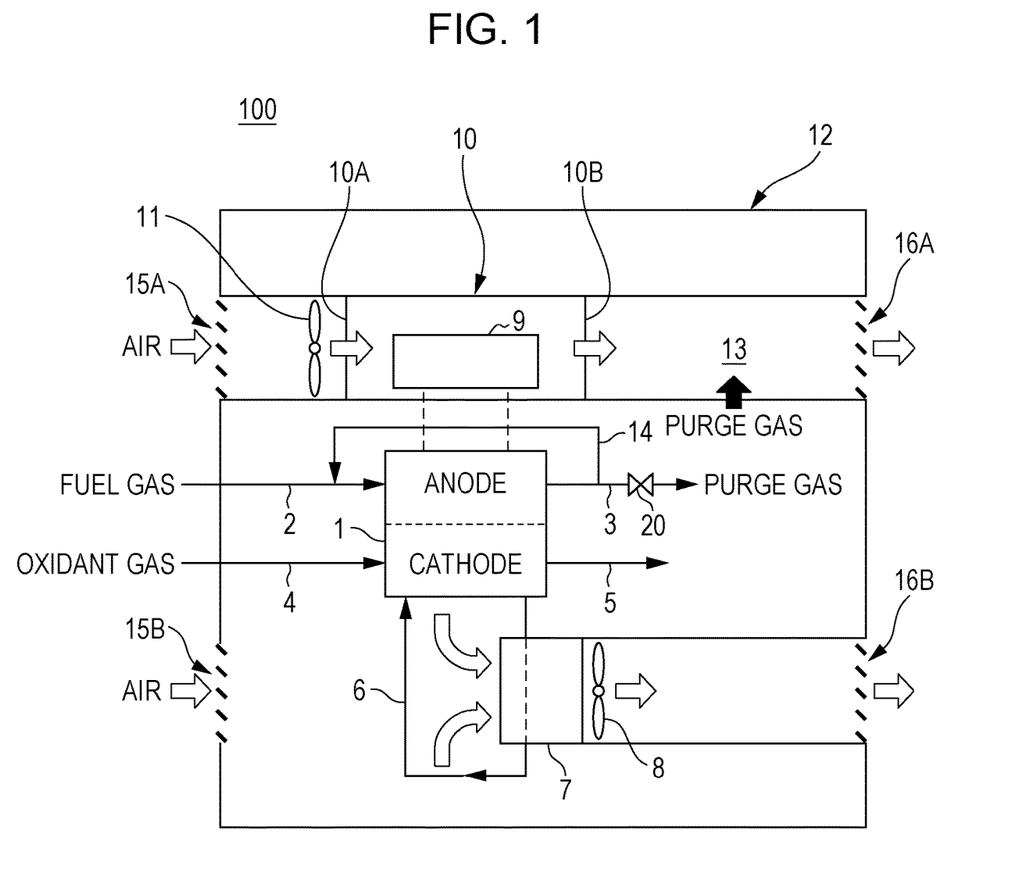
FIG. 1 is a diagram showing an example of a fuel cell system in a first embodiment.

FIG. 1 is a diagram illustrating an example of a fuel cell system in a first embodiment.

In the example shown in FIG. 1, the fuel cell system 100 in the present embodiment includes a fuel cell 1, an anode off-gas discharge path 3, a purge valve 20, a heating medium circulation path 6, a heat exchanger 7, a second air feeder 8, an electric power converter 9, a case 10, a first air feeder 11, a housing 12, and an air discharge path 13.

The housing 12 is a container that houses at least the fuel cell 1, the heat exchanger 7, the second air feeder 8, the case 10, and the first air feeder 11. The housing 12 is an outer enclosure surrounding these components and is a member that separates the fuel cell system 100 from its external environment. It is therefore preferable to form the housing 12 using a stiff anticorrosive material. The housing 12 may be, for example, an outer enclosure formed from stainless steel plates, but this is not a limitation.

The fuel cell 1 includes an anode and a cathode and generates and outputs electric power using a fuel gas supplied to the anode and an oxidant gas supplied to the cathode. Specifically, the fuel gas is supplied to the anode of the fuel cell 1 through an anode gas supply path 2, and the oxidant gas is supplied to the cathode of the fuel cell 1 through a cathode gas supply path 4. Hydrogen in the fuel gas electrochemically reacts with oxygen in the oxidant gas, and electric power is thereby generated.

For example, the fuel cell 1 includes a membrane electrode assembly (MEA), which is a stack of the anode, the cathode, and an electrolyte (not shown) sandwiched between them. The anode and cathode (electrodes) each include, for example: a catalyst layer formed from carbon particles supporting a noble metal catalyst such as platinum; and a gas diffusion layer formed from carbon paper or carbon felt, but this is not a limitation.

The fuel cell 1 can be of any type. In the fuel cell system 100 in the present embodiment, a solid polymer electrolyte fuel cell (PEFC) is described as an example of the fuel cell 1, but this is not a limitation.

The fuel gas may be, for example, hydrogen gas. In this case, the hydrogen gas is supplied from a hydrogen gas supply source to the anode of the fuel cell 1. The hydrogen gas supply source has a prescribed supply pressure, and examples of the hydrogen gas supply source include a hydrogen gas infrastructure and a hydrogen gas cylinder. The hydrogen required in the hydrogen gas supply source may be generated by, for example, a water electrolyzer or a reformer.

A device that controls the flow rate of hydrogen gas to be supplied to the anode of the fuel cell 1 may be disposed in the anode gas supply path 2. This device may include, for example, a pressure booster and a flow regulating valve or may include only one of them. The pressure booster used may be, for example, a pump, but this is not a limitation.

Since flammable hydrogen gas flows through the anode gas supply path 2, it is preferable to form the anode gas supply path 2 from, for example, a tube made of a flame-retardant material (a metal tube such as a stainless steel tube).

The oxidant gas may be, for example, air. In this case, a pressure booster is disposed in the cathode gas supply path 4. The pressure booster used may be, for example, a compressor or a pump, but this is not a limitation. The cathode gas supply path 4 may be formed, for example, from a metal tube such as a stainless steel tube or a crosslinked polyethylene tube.

The heating medium circulation path 6 is a path through which a heating medium that recovers heat generated in the fuel cell 1 is circulated. The heating medium circulation path 6 is formed, for example, from a metal tube such as a stainless steel tube or a crosslinked polyethylene tube. The heating medium may be, for example, cooling water. The cooling water is preferably ion exchanged water.

During electric power generation of the fuel cell 1, the following devices that are necessary to maintain the operating temperature of the fuel cell 1 at an appropriate temperature are provided as needed.

The heat exchanger 7 is disposed in the heating medium circulation path 6 and is a device used to cool the heating medium flowing through the heating medium circulation path 6. The heat exchanger 7 may have any structure so long as it can cool the heating medium flowing through the heating medium circulation path 6. For example, a flow path member through which the heating medium flows passes through the heat exchanger 7. This flow path member may be formed, for example, from a stainless steel tube and may include a heat exchange member (not shown) such as a radiation fin.

The second air feeder 8 is a device that supplies air to the heat exchanger 7. The second air feeder 8 may have any structure so long as it can supply air to the heat exchanger 7. The second air feeder 8 may be, for example, a fan with controllable rotation speed, but this is not a limitation.

In the fuel cell system 100 in the present embodiment, the second air feeder 8 is disposed in an air outflow path extending from an air outlet 16B provided in the housing 12 to the heat exchanger 7. Therefore, when the second air feeder 8 is actuated, air in the housing 12 flows into the heat exchanger 7 through an opening (not shown) provided in the heat exchanger 7, then passes through the air outflow path, and is discharged from the air outlet 16B to the outside of the housing 12. In this case, heat is exchanged between the air and the heating medium passing through the flow path member in the heat exchanger 7. The heat of the heating medium is thereby removed, and the heating medium is cooled. In this manner, the heat exchanger 7 and the second air feeder 8 form an air-cooled radiator in which the heating medium is cooled by heat exchange.

When the second air feeder 8 is actuated, outside air flows into the housing 12 through an air inlet 15B provided in the housing 12. Specifically, the second air feeder 8 has the function of ventilating the housing 12.

Although not illustrated, a pump, a temperature sensor, etc. may be disposed in appropriate positions in the heating medium circulation path 6. An unillustrated controller may feedback-control the operations of the pump, the second air feeder 8, etc. such that the temperature of the heating medium that recovers the heat of the fuel cell 1 is adjusted to a prescribed temperature.

The controller may have any structure so long as it has the control function. The controller includes, for example, an arithmetic circuit and a storage circuit that stores a control program. Examples of the arithmetic circuit include an MPU and a CPU. Examples of the storage circuit include a memory. The controller may be a single controller that performs centralized control or may include a plurality of controllers that perform decentralized control in a cooperative manner.

The operating temperature of the fuel cell 1 is maintained at an appropriate temperature in the manner described above.

The electric power converter 9 is a device that converts the electric power output from the fuel cell 1. The electric power converter 9 may have any structure so long as it can convert the electric power output from the fuel cell 1. For example, the electric power converter 9 may include a DC/AC convertor that converts the DC electric power generated in the fuel cell 1 into AC electric power so that it can be used for an external load. The electric power converter 9 may include a DC/DC convertor that boosts part of the DC electric power generated in the fuel cell 1 such that the resulting DC electric power can be used, for example, for auxiliaries of the fuel cell system 100.

The case 10 is a container that houses the electric power converter 9. The case 10 surrounds the electric power converter 9 and forms a flow path for air used to maintain the temperature of the electric power converter 9 at a temperature equal to or lower than the upper limit of its operating temperature. The case 10 may have any shape so long as it can house and protect the electric power converter 9. Examples of the case 10 include, but not limited to, cases made of resins such as polyphenylene sulfide (PPS) and cases made of metals such as aluminum.

The first air feeder 11 is a device that supplies air to the case 10. The first air feeder 11 may have any structure so long as it can supply air to the case 10. The first air feeder 11 may be, for example, a fan with controllable rotation speed, but this is not a limitation.

The air discharge path 13 is a flow path for discharging air having passed through the case 10 to the outside of the housing. The air discharge path 13 may be formed, for example, from a flow path member made of a resin such as PPS or a flow path member made of a metal such as aluminum.

In the fuel cell system 100 in the present embodiment, the first air feeder 11 is disposed in an air inflow path extending from an air inlet 15A provided in the housing 12 to a first wall 10A of the case 10. When the first air feeder 11 is actuated, air on the outside of the housing 12 flows into the case 10 through an opening (not shown) provided in the first wall 10A. The air in the case 10 flows into the air discharge path 13 through an opening (not shown) provided in a second wall 10B, then flows through the air discharge path 13, and is discharged from an air outlet 16A to the outside of the housing 12. In this case, heat is exchanged between components (such as semiconductor elements) of the electric power converter 9 and the air flowing through the case 10. The heat of the electric power converter 9 is thereby removed, and the electric power converter 9 is cooled. In this manner, the case 10 and the first air feeder 11 form an air-cooled radiator in which the electric power converter 9 is cooled by heat exchange.

Although not illustrated, a temperature sensor etc. may be disposed in appropriate positions of the electric power converter 9. An unillustrated controller may feedback-control the operations of the first air feeder 11 etc. such that the temperature of the electric power converter 9 is adjusted to a prescribed temperature.

During electric power generation of the fuel cell 1, the anode off-gas circulates from an anode outlet of the fuel cell 1 back to an anode inlet of the fuel cell 1 through an anode off-gas circulation path 14 until hydrogen in the anode off-gas is consumed for electric power generation in the fuel cell 1.

The fuel cell system 100 in the present embodiment includes: the anode off-gas discharge path 3 that is branched from an intermediate point of the anode off-gas circulation path 14; and the purge valve 20 disposed in this anode off-gas discharge path 3. Specifically, the anode off-gas discharge path 3 is a flow path for discharging the anode off-gas exhausted from the anode of the fuel cell 1 to the outside of the anode off-gas circulation path 14. The purge valve 20 used may be an electromagnetic valve, but this is not a limitation. Since the flammable anode off-gas flows through the anode off-gas discharge path 3 and the anode off-gas circulation path 14, the anode off-gas discharge path 3 and the anode off-gas circulation path 14 are each formed from, for example, a tube made of a flame retardant material (a metal tube such as a stainless steel tube).

When the purge valve 20 is in a closed state, the anode off-gas circulates from the anode outlet of the fuel cell 1 back to the anode inlet until hydrogen in the anode off-gas is consumed for electric power generation in the fuel cell 1. Then, in the course of the circulation of the anode off-gas, the amount of impurities other than the fuel gas (hydrogen gas) in the anode off-gas increases with time. Examples of the impurities include nitrogen gas leaking from the cathode to the anode through the electrolyte membrane. This is because air flows through the cathode of the fuel cell 1. When the amount of impurities mixed into the anode off-gas increases, the concentration of hydrogen in the anode off-gas decreases. Therefore, during electric power generation of the fuel cell 1, the purge valve 20 is temporarily opened at an appropriate timing, and a purge gas containing impurities is discharged (purged) from the anode off-gas circulation path 14.

As described above, in the fuel cell system 100 in the present embodiment, the concentration of impurities mixed into the anode off-gas can be reduced, so that the concentration of hydrogen in the anode off-gas can be appropriately recovered.

In the fuel cell system 100 in the present embodiment, a downstream end of the anode off-gas discharge path 3 is connected to the air discharge path 13. Specific connection forms between the downstream end of the anode off-gas discharge path 3 and the air discharge path 13 will be described in a first example and a second example.

As described above, in the fuel cell system 100 in the present embodiment, the amount of air used to dilute the anode off-gas during the purge operation for discharging impurities in the anode off-gas to the outside can be maintained more appropriately than in conventional fuel cell systems.

Specifically, in the fuel cell system 100 in the present embodiment, during the purge operation for discharging impurities in the anode off-gas to the outside, the air used to cool the electric power converter 9 is used to dilute the anode off-gas. Therefore, the anode off-gas can be diluted with air separately from the temperature control of the fuel cell 1.

Unlike the fuel cell 1, the electric power converter 9 is a device that operates at a temperature equal to or lower than the upper limit of its operating temperature. For example, the fuel cell 1 often operates at a temperature between about 55° C. to about 75° C. However, the electric power converter 9 (e.g., a DC/AC convertor) often operates at a temperature of about 60° C. or lower. The lower limit of the operating temperature of the DC/AC convertor is, for example, about −10° C. Therefore, when the DC/AC convertor is air-cooled, it is unnecessary to reduce the amount of air used to cool the DC/AC convertor so that its operating temperature is prevented from falling below the lower limit.

Specifically, it is only necessary for the radiator (the case 10 and the first air feeder 11) for the electric power converter 9 to have the function of cooling the electric power converter 9 to a temperature equal to or lower than the upper limit of the operating temperature of components (e.g., semiconductor elements) of the electric power converter 9. Therefore, since it is unnecessary that the controlled variable (i.e., the amount of air) of the first air feeder for supplying air to the electric power converter 9 be controlled in accordance with a reduction in outside temperature (i.e., controlled using a small amount of air), the necessary amount of air used to dilute the anode off-gas can be easily maintained.

Figure 2A:
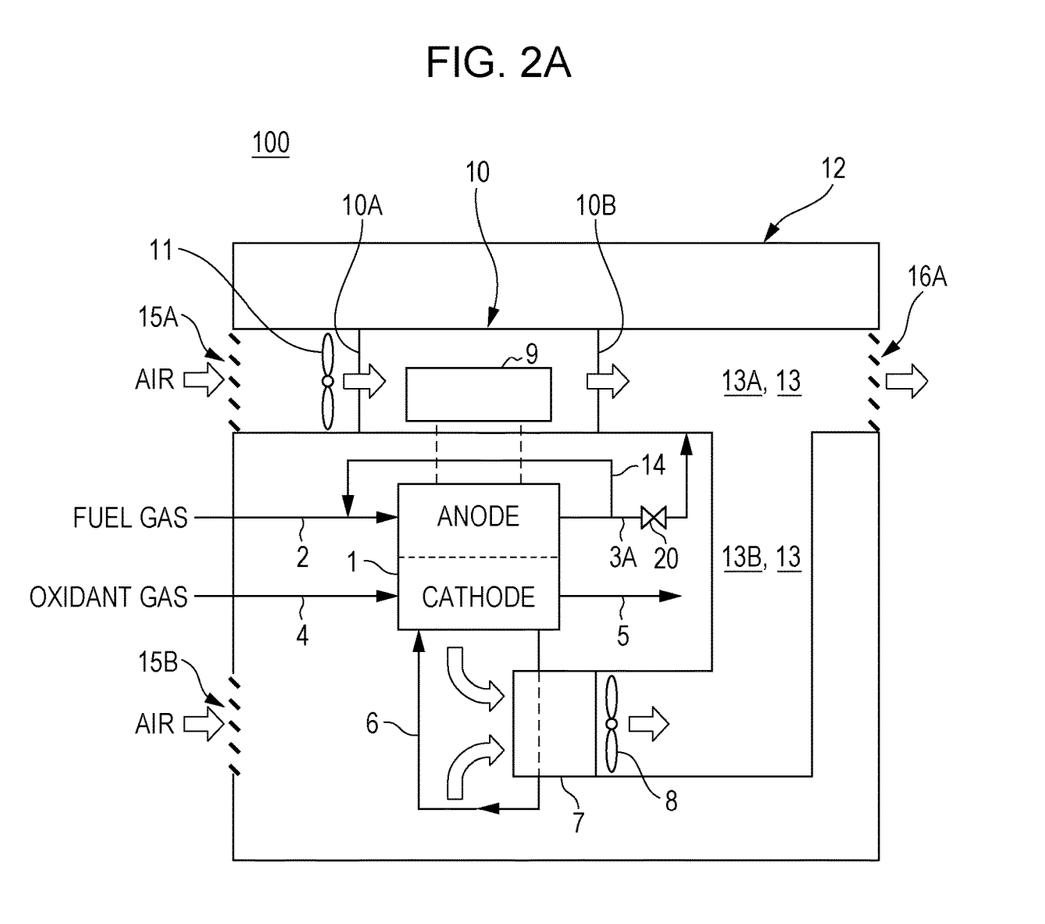
FIG. 2A is a diagram showing an example of a fuel cell system in a first example of the first embodiment.

The structure of the electric power converter 9, the operating temperature of the fuel cell 1, and the operating temperature of the electric power converter 9 are merely examples and are not limited to those in the present embodiment, First Example FIG. 2A is a diagram showing an example of a fuel cell system in a first example of the first embodiment.

In the example shown in FIG. 2A, the fuel cell system 100 in the present embodiment includes a fuel cell 1, an anode off-gas discharge path 3A, a purge valve 20, a heating medium circulation path 6, a heat exchanger 7, a second air feeder 8, an electric power converter 9, a case 10, a first air feeder 11, a housing 12, and an air discharge path 13.

The fuel cell 1, the purge valve 20, the heating medium circulation path 6, the heat exchanger 7, the second air feeder 8, the electric power converter 9, the case 10, and the first air feeder 11 are the same as those in the first embodiment, and their description will be omitted.

The air discharge path 13 includes: a first discharge path 13A extending from the air outlet 16A provided in the housing 12 to the case 10; and a second discharge path 13B branched from the first discharge path 13A and extending to the heat exchanger 7. In this case, since it is unnecessary to provide the air outlet 16B (see FIG. 1) in the housing 12, the number of air outlets provided in the housing 12 can be reduced. Moreover, since the number of members forming the air outlet can be reduced, a reduction in cost can be achieved, and flexibility in layout in the housing 12 increases.

In the fuel cell system 100 in the present embodiment, the downstream end of the anode off-gas discharge path 3A is connected to the first discharge path 13A.

Therefore, in the purge operation for discharging impurities in the anode off-gas to the outside, the air used to cool the electric power converter 9 is used to dilute the anode off-gas, and the air used to cool the heat exchanger 7 can be used to further dilute the anode off-gas.

During startup, shutdown, and standby of the fuel cell system 100, it is unnecessary to control the temperature of the fuel cell 1. Therefore, during startup, shutdown, and standby of the fuel cell system 100, since it is unnecessary that the controlled variable (i.e., the amount of air) of the second air feeder 8 for supplying air to the heat exchanger 7 be controlled in accordance with a reduction in outside temperature (i.e., controlled using a small amount of air), the concentration of hydrogen in the anode off-gas can be further reduced.

In the fuel cell system 100 in the present embodiment, features other than the above feature may be the same as those of the fuel cell system 100 in the first embodiment.

Second Example

Figure 2B:
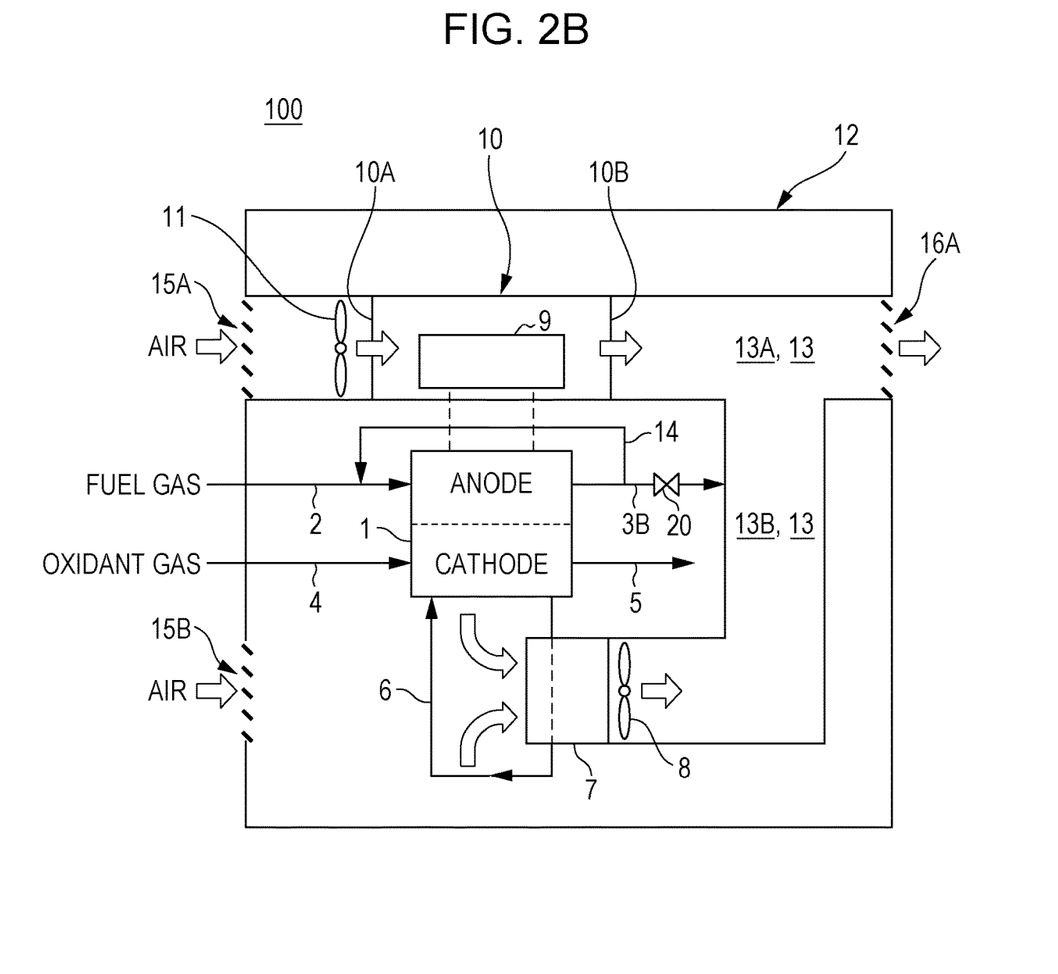
FIG. 2B is a diagram showing an example of a fuel cell system in a second example of the first embodiment.

FIG. 2B is a diagram showing an example of a fuel cell system in a second example of the first embodiment.

In the example shown in FIG. 2B, the fuel cell system 100 in the present embodiment includes a fuel cell 1, an anode off-gas discharge path 3B, a purge valve 20, a heating medium circulation path 6, a heat exchanger 7, a second air feeder 8, an electric power converter 9, a case 10, a first air feeder 11, a housing 12, and an air discharge path 13.

The fuel cell 1, the purge valve 20, the heating medium circulation path 6, the heat exchanger 7, the second air feeder 8, the electric power converter 9, the case 10, and the first air feeder 11 are the same as those in the first embodiment, and their description will be omitted.

The air discharge path 13 includes: a first discharge path 13A extending from the air outlet 16A provided in the housing 12 to the case 10; and a second discharge path 13B branched from the first discharge path 13A and extending to the heat exchanger 7. In this case, since it is unnecessary to provide the air outlet 16B (see FIG. 1) in the housing 12, the number of air outlets provided in the housing 12 can be reduced. Moreover, since the number of members forming the air outlet can be reduced, a reduction in cost can be achieved, and flexibility in layout in the housing 12 increases.

In the fuel cell system 100 in the present embodiment, the downstream end of the anode off-gas discharge path 3B is connected to the second discharge path 13B.

Therefore, in the purge operation for discharging impurities in the anode off-gas to the outside, the air used to cool the heat exchanger 7 and also the air used to cool the electric power converter 9 can be used to dilute the anode off-gas.

In the fuel cell system 100 in the present embodiment, features other than the above feature may be the same as those of the fuel cell system 100 in the first embodiment.

Second Embodiment

Figure 3:
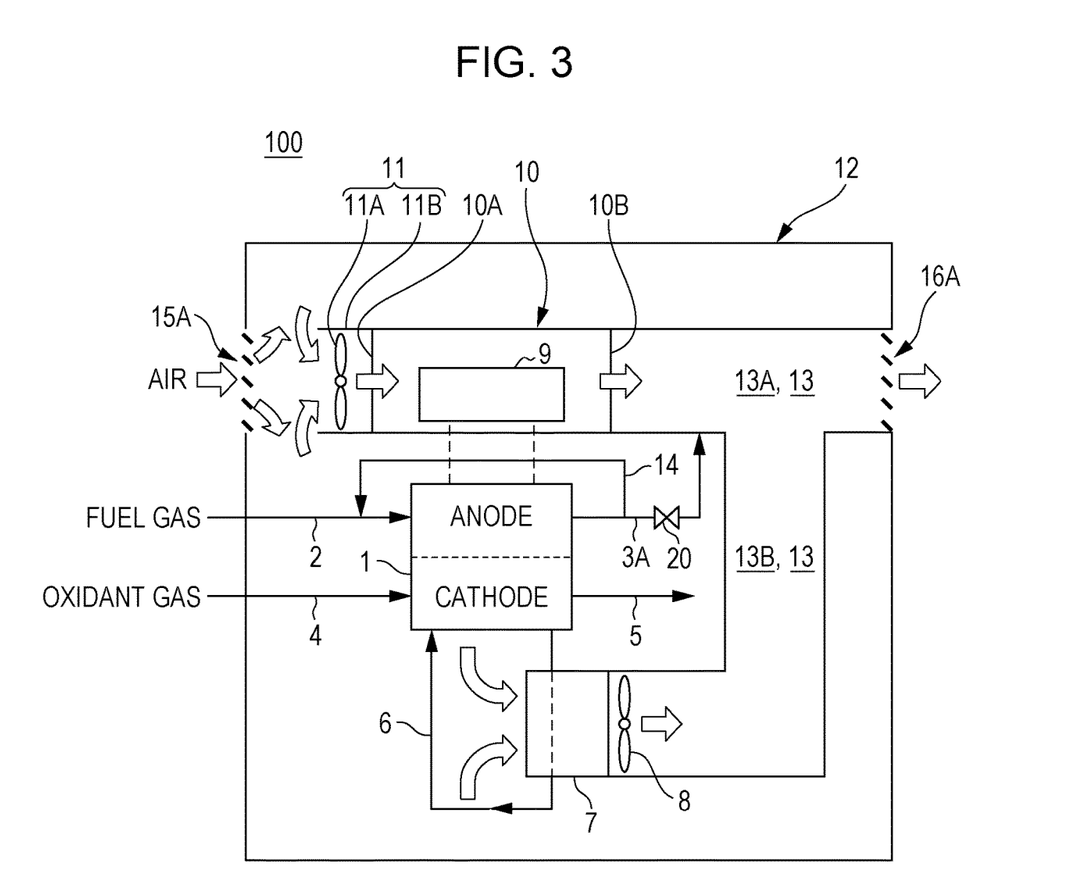
FIG. 3 is a diagram showing an example of a fuel cell system in a second embodiment.

FIG. 3 is a diagram showing an example of a fuel cell system in a second embodiment.

In the example shown in FIG. 3, the fuel cell system 100 in the present embodiment includes a fuel cell 1, an anode off-gas discharge path 3A, a purge valve 20, a heating medium circulation path 6, a heat exchanger 7, a second air feeder 8, an electric power converter 9, a case 10, a first air feeder 11, a housing 12, and an air discharge path 13.

The fuel cell 1, the purge valve 20, the heating medium circulation path 6, the heat exchanger 7, the second air feeder 8, the electric power converter 9, and the case 10 are the same as those in the first embodiment, and their description will be omitted. The anode off-gas discharge path 3A and the air discharge path 13 are the same as those in the first example of the first embodiment, and their description will be omitted.

The first air feeder 11 includes a fan 11A that blows air and a hood 11B that surrounds the fan 11A. A space is formed between the hood 11B and the housing 12, and the space communicates with the inside of the housing 12 in which the fuel cell 1 is disposed. Air passes through the space formed between the hood 11B and the housing 12, and the inside of the housing 12 is thereby ventilated. Specifically, the air flowing from the air inlet 15A provided in the housing 12 passes through the space described above, then flows sequentially through the hood 11B, the case 10, and the first discharge path 13A of the air discharge path 13, and is discharged to the outside of the housing 12. In this manner, the housing 12 can be ventilated, and the electric power converter can be cooled.

In the above configured fuel cell system 100 in the present embodiment, the first air feeder 11 can serve as a ventilator. In this case, even when the controlled variable (i.e., the amount of air) of the second air feeder 8 for supplying air to the heat exchanger 7 is controlled in accordance with a reduction in outside temperature (i.e., controlled using a small amount of air), the inside of the housing 12 can be appropriately ventilated. When no dedicated ventilator is necessary or when the dedicated ventilator can be reduced in size, the structure of the fuel cell system 100 can be simplified, and a reduction in cost can be achieved.

Since it is unnecessary to provide the air inlet 15B (see FIG. 1) in the housing 12, the number of air inlets for ventilating the housing 12 can be reduced. Moreover, since the number of members forming the air inlet can be reduced, a reduction in cost can be achieved, and flexibility in layout in the housing 12 increases.

In the fuel cell system 100 in the present embodiment, features other than the above feature may be the same as those of the fuel cell system 100 in the first embodiment, the first example of the first embodiment, or the second example of the first embodiment. In FIG. 3, the downstream end of the anode off-gas discharge path 3A is connected to the first discharge path 13A. However, for example, the downstream end of the anode off-gas discharge path may be connected to the second discharge path 13B.

Modification

Figure 4:
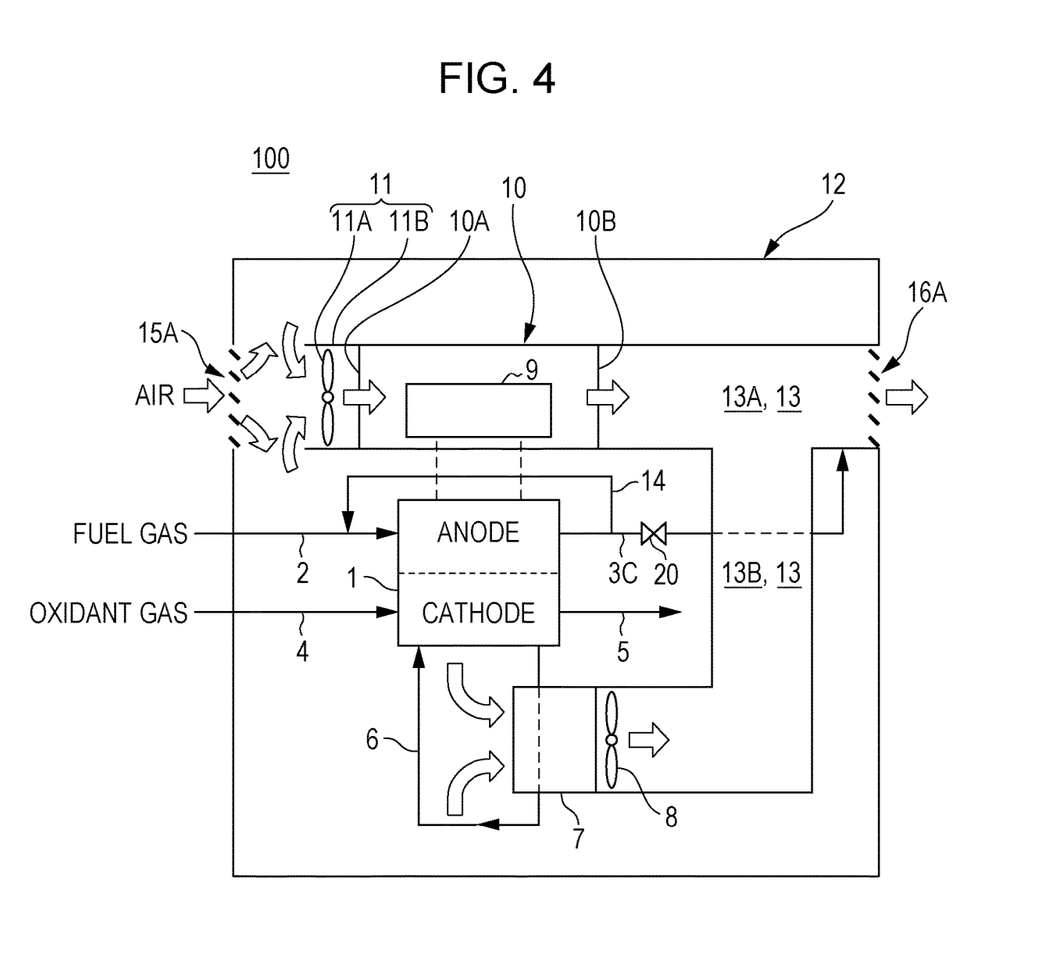
FIG. 4 is a diagram showing an example of a fuel cell system in a modification of the second embodiment.

FIG. 4 is diagram showing an example of a fuel cell system in a modification of the second embodiment.

In the example shown in FIG. 4, the fuel cell system 100 in the present embodiment includes a fuel cell 1, an anode off-gas discharge path 3C, a purge valve 20, a heating medium circulation path 6, a heat exchanger 7, a second air feeder 8, an electric power converter 9, a case 10, a first air feeder 11, a housing 12, and an air discharge path 13.

The fuel cell 1, the purge valve 20, the heating medium circulation path 6, the heat exchanger 7, the second air feeder 8, the electric power converter 9, and the case 10 are the same as those in the first embodiment, and their description will be omitted. The air discharge path 13 is same as that in the first example of the first embodiment, and its description will be omitted. The first air feeder 11 is the same as that in the second embodiment, and its description will be omitted.

The downstream end of the anode off-gas discharge path 3C is connected to the first discharge path 13A at a position downstream, with respect to the flow direction of air, of a branch portion at which the second discharge path 13B is branched from the first discharge path 13A. In other words, the downstream end of the anode off-gas discharge path 3C is connected to the first discharge path 13A at a position between the branch portion and the air outlet 16A.

Suppose that the downstream end of the anode off-gas discharge path 3A is connected to the first discharge path 13A at a position upstream of the branch portion. In the purge operation for discharging impurities in the anode off-gas to the outside, if the second air feeder 8 for supplying air to the heat exchanger 7 is not operating, there is a possibility that the anode off-gas flows into the second discharge path 13B from the first discharge path 13A and then flows into the housing 12 through the second discharge path 13B. However, in the fuel cell system 100 in this modification, since the downstream end of the anode off-gas discharge path 3A is connected to the first discharge path 13A at a position downstream of the branch portion, such a possibility is low.

In the fuel cell system 100 in this modification, features other than the above feature may be the same as those of the fuel cell system 100 in the first embodiment, the first example of the first embodiment, or the second example of the first embodiment.

In FIGS. 1 to 4, the first air feeder 11 is disposed upstream of the electric power converter 9 in the air flow within the case 10, and air is supplied in a forced draft manner, but this is not a limitation. Specifically, the first air feeder may be disposed downstream of the electric power converter 9 in the air flow within the case 10, and air may be supplied in an induced draft manner. When air is supplied in the induced draft manner, the electric power converter 9 is not exposed to a turbulent flow and can be cooled efficiently.

The first embodiment, the first example of the first embodiment, the second example of the first embodiment, the second embodiment, and the modification of the second embodiment may be combined with each other so long as they do not exclude each other.

From the foregoing description, many modifications and other embodiments of the present disclosure will be apparent to those skilled in the art. Therefore, the foregoing description is to be construed as illustrative only and is provided for the purpose of teaching those skilled in the art the best mode of carrying out the present disclosure. The details of the structure and/or function of the present disclosure may be changed substantially without departing from the spirit of the present disclosure.

The aspects of the present disclosure can be used for a fuel cell system in which the amount of air used to dilute the anode off-gas in the purge operation for discharging impurities in the anode off-gas to the outside can be maintained more appropriately than in conventional fuel cell systems.

What is claimed is:

1. A fuel cell system comprising:
    a fuel cell that generates and outputs electric power using a fuel gas supplied to an anode and an oxidant gas supplied to a cathode;
    an anode off-gas discharge path through which unburned anode off-gas exhausted from the anode of the fuel cell is discharged;
    an electric power converter that converts the electric power output from the fuel cell;
    a case that houses the electric power converter;
    a first air feeder that supplies air to the case;
    a housing that houses the fuel cell, the case, and the first air feeder; and
    an air discharge path through which the air having passed through the case is discharged to outside of the housing,
    wherein a downstream end of the anode off-gas discharge path is directly connected to the air discharge path so as to allow the unburned anode-off gas to be diluted by the air in the air discharge path, and
    wherein an amount of air utilized to dilute the unburned anode-off gas and an amount of air utilized to cool the fuel cell are separately controllable.

2. The fuel cell system according to claim 1, further comprising:

a heating medium circulation path through which a heating medium that recovers heat generated in the fuel cell is circulated;

a heat exchanger disposed in the heating medium circulation path; and a second air feeder that supplies air to the heat exchanger, wherein the housing further houses the heat exchanger and the second air feeder.

3. The fuel cell system according to claim 2, wherein the air discharge path includes:

a first discharge path extending from an air outlet provided in the housing to the case; and a second discharge path branched from the first discharge path and extending to the heat exchanger.

4. The fuel cell system according to claim 3, wherein the downstream end of the anode off-gas discharge path is connected to the first discharge path.

5. The fuel cell system according to claim 3, wherein the downstream end of the anode off-gas discharge path is connected to the second discharge path.

6. The fuel cell system according to claim 1, wherein:

the first air feeder includes a fan that blows air and a hood that surrounds the fan, and an inside of the housing is ventilated by causing air to pass through a space formed between the hood and the housing by the first air feeder.

7. The fuel cell system according to claim 6, wherein air flowing into the housing from an air inlet provided therein passes through the space, then flows sequentially through the hood, the case, and the air discharge path, and is discharged to the outside of the housing.

8. A fuel cell system comprising:

a fuel cell that generates and outputs electric power using a fuel gas supplied to an anode and an oxidant gas supplied to a cathode;

an anode off-gas discharge path through which unburned anode off-gas exhausted from the anode of the fuel cell is discharged;

an electric power converter that converts the electric power output from the fuel cell;

a case that houses the electric power converter;

a first air feeder that supplies air to the case;

a housing that houses the fuel cell, the case, and the first air feeder;

an air discharge path through which the air having passed through the case is discharged to outside of the housing, a second air feeder that supplies air to a heat exchanger, wherein a downstream end of the anode off-gas discharge path is connected to the air discharge path so as to allow the unburned anode-off gas to be diluted by the air in the air discharge path, and the first air feeder and the second air feeder are separately controllable so to allow the amount of air utilized to dilute the unburned anode-off gas and the amount of air supplied to the heat exchanger to be individually controlled and different from one another.

9. A fuel cell system of claim 8, wherein the amount of air utilized to dilute the unburned anode-off gas and the amount of air utilized to cool the fuel cell are separately controllable.

* * * * *